United States Patent
Lombard et al.

[15] 3,691,873
[45] Sept. 19, 1972

[54] FREQUENCY-RESPONSIVE CONTROL DEVICES, NOTABLY FOR REDUCING THE AIR POLLUTION CAUSED BY PETROL ENGINES

[72] Inventors: Claude Lombard; Jean-Louis Perrin, both of Billancourt, France

[73] Assignees: Regie Nationale des Usines Renault, Billancourt/(Haute de Seine); Automobiles Peugeot, Paris, France

[22] Filed: Sept. 21, 1970

[21] Appl. No.: 73,764

[52] U.S. Cl..................74/866, 74/752 A, 74/860, 123/102
[51] Int. Cl..........................F02s 11/10, B60k 11/16
[58] Field of Search......123/102; 74/866, 752 A, 860

[56] References Cited

UNITED STATES PATENTS

| | | | |
|---|---|---|---|
| 3,356,082 | 12/1967 | Jukes | 123/102 |
| 3,297,104 | 1/1967 | Fox | 123/102 |
| 3,581,839 | 6/1971 | Carp | 123/102 X |
| 3,556,064 | 1/1971 | Date | 123/102 X |
| 3,568,651 | 3/1971 | Waag | 123/102 X |

*Primary Examiner*—Carlton R. Croyle
*Assistant Examiner*—R. J. Sher
*Attorney*—Stevens, Davis, Miller & Mosher

[57] ABSTRACT

An air pollution reducing electronic frequency responsive control device for controlling the carburetor throttle, the gear changing mechanism, and the ignition vacuum advance of an internal combustion engine of a vehicle. The control device includes a vehicle speed responsive governor which provides an input to an electronic circuit which in turn controls one or a plurality of electromagnetic valves. One electromagnetic valve acts to prevent complete closing of the carburetor throttle when the vehicle is traveling above a predetermined speed, thus preventing an excessively rich fuel mixture if the operator remove his foot from the accelerator pedal.

8 Claims, 4 Drawing Figures

PATENTED SEP 19 1972 3,691,873
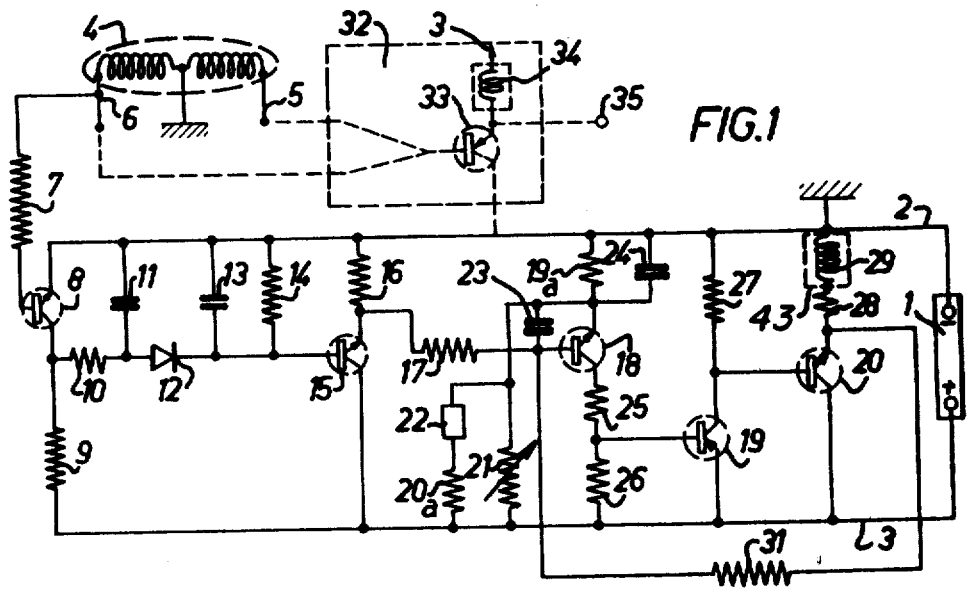
FIG.1
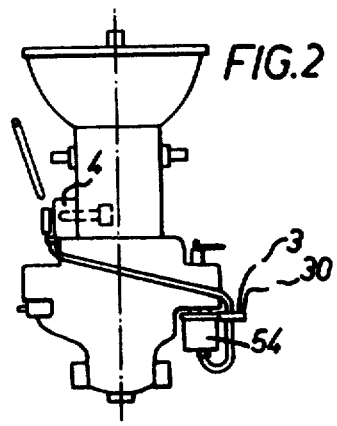
FIG.2
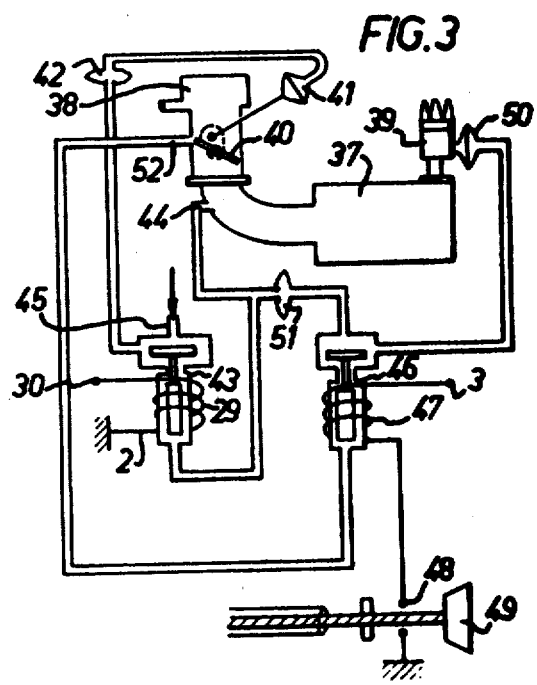
FIG.3
FIG.4

FREQUENCY-RESPONSIVE CONTROL DEVICES, NOTABLY FOR REDUCING THE AIR POLLUTION CAUSED BY PETROL ENGINES

Various devices have already been proposed for reducing the percentage of carbon monoxide and unburnt fuel released in the atmosphere during the deceleration or coasting of automotive vehicles powered by petrol engines. Their operating principle is either the cutting off of the petrol supply or the slight opening of the gas throttle to avoid, in this last instance, the attaining of maximum vacuum values obviously inadequate for a proper combustion. These devices may be rendered inoperative at low engine or vehicle speed, in order to avoid the stalling of the engine or an excessive driving torque making it difficult to operate the vehicle at low speeds, such as in town driving or when parking, etc.

It is the essential object of the present invention to provide an electronic device designed for controlling the operation of an electromagnetic valve or an electromagnet for performing the above-mentioned functions according to the frequency of a so-called "governor" alternator operatively connected to the wheels of the vehicle and consisting for example of an alternator of the type described and illustrated in the U.S. Pat. Nos. 3,344,294 of Sept. 26, 1967, and 3,443,135 of May 6, 1969, this generator being also adapted to control the automatic gear-change transmission.

In order to afford a clearer understanding of this invention typical forms of embodiment thereof will now be described by way of example with reference to the accompanying drawing, in which:

FIG. 1 is the wiring diagram of the electronic device adapted to energize the electromagnetic valve for slightly opening the throttle valve as a function of the vehicle or engine speed; in this figure the dash lines illustrate the electronic mounting for automatically changing the speed or gear ratio, and more particularly the output transistor and the electromagnetic valve of which the de-energization causes the change from intermediate to high speed (energized in the low and intermediate gears);

FIG. 2 is a simplified elevational view showing the change-speed transmission mechanism and more particularly the governor and the electronic case enclosing the gear change control means and the component elements of the wiring diagram of FIG. 1;

FIG. 3 is an electro-pneumatic diagram showing the means controlling the throttle valve opening through the electronic diagram of FIG. 1 and the ignition vacuum timing control conjugated with the choke or starter control pull-knob; and FIG. 4 is a modified arrangement of the means shown in FIG. 3, wherein the ignition vacuum timing control is operative only when the lowest gear is engaged; to this end, an isolating electromagnetic valve is responsive to the change-speed transmission control lever.

Referring first to FIG. 1, the reference numeral 1 designates the source of current connected to a positive line 3 and a negative line 2; this assembly comprises a governor 4 having two symmetric outputs 5 and 6, the latter 6 being connected via a resistor 7 to the base of an NPN transistor 8 having its emitter connected to the negative line 2 and its collector through another resistor 9 to the positive line 3. The collector of transistor 8 is also connected to a circuit acting as a diode pump which comprises resistors 10 and 14, capacitors 11 and 13, a diode 12, and leads to the base of another NPN transistor 15 mounted as an emitter charge with a resistor 16. Another resistor 17 connects this emitter to the base of a transistor 18 constituting with transistors 19 and 20 a flip-flop of which the condition depends on the voltage fed to 18. The emitter of transistor 18 is set at a voltage constituting a threshhold value via resistors 19a, 20a, 21, 22. The last resistor 22 of this set has a negative temperature coefficient in order to provide the thermal compensation of the circuit. Capacitors 24 and 23 are provided for by-passing and timing the circuit and thus reduce the detrimental effect of supply strays. Inserted in series in the collector circuit are resistors 25 and 26 adapted to bias the base of transistor 19 having its collector connected to the base of transistor 20 and to the negative line 2 via a resistor 27. In the emitter circuit of transistor 20 are connected in series at point 30 a protection resistor 28 and the coil 29 of an electromagnetic valve 43 or electromagnet connected to the negative line 2. From this emitter also extends a feedback resistor 31 having its other end connected to the base of transistor 18.

The gear-change control section of transmission 32, operating for example in response to the voltage delivered by the governor 4 in a manner known per se and notably in one of the applicants' patents, for example in the U.S. Pat. No. 3,403,747 of Oct. 1, 1968, comprises a transistor 33 controlling an electromagnetic valve 34 having an output 35 of the emitter of said transistor for controlling the electromagnetic valve 36 of FIG. 4.

FIG. 2 shows the arrangement of governor 4 and electronic case 54 on the change-speed transmission case, the reference numeral 54 designating in general the complete assembly illustrated diagrammatically in FIG. 1.

FIG. 3 illustrates diagrammatically the engine 37 of the vehicle, which is equipped with a carburettor 38 and a distributor 39. The carburettor throttle 40 is adapted to be controlled through the accelerator pedal (not shown) and also through the vacuum diaphragm chamber 41 which is adapted to open slightly said throttle. This vacuum diaphragm chamber 41 is connected via a damping chamber 42 to a three-way electromagnetic valve 43 having its winding 29 responsive to transistor 20 as a function of the vehicle speed. When energized this electromagnetic valve 43 causes the vacuum diaphragm chamber 41 to communicate with the surrounding atmosphere through an orifice 45. When de-energized and released this electromagnetic valve 43 connects the suction pipe 44 (from the induction manifold) to the vacuum diaphragm chamber 41, so as to open the throttle.

Another electromagnetic valve 46, having its coil 47 adapted to be energized through a contact 48 responsive to the manual control pull-knob 49 of the choke or starter device, is adapted, when energized, to connect the suction pipe 44 to the vacuum chamber 50 of distributor 39 via another damping chamber 51, permitting control of the ignition advance by means of the starter control, even when the accelerator pedal is released. When this electromagnetic valve 46 is released as a consequence of the de-energization of coil 47, the vacuum chamber 50 is again normally responsive to the vacuum pipe 52 connected to a point located upstream of throttle 40, when the latter is closed, thus preventing any ignition advance when the accelerator pedal is released.

As an alternative, the electromagnetic valve 36 of FIG. 4 may be adapted, when energized, to isolate the vacuum chamber 50 from suction pipe 52 and connect this vacuum chamber 50 to the external atmosphere via pipe 53, the terminals 35 and 3 of winding 36 being connected to the corresponding points of FIG. 1.

The mode of operation of this device is extremely simple. When the vehicle is still (see FIG. 1), the output voltage of governor 4 is zero and transistor 8 is not conductive; most of the voltage from source 1 is present across the terminals of transistor 15 and therefore of resistor 16. Since this voltage is higher than that of the emitter of transistor 18, the latter becomes conductive as well as transistors 19 and 20. Winding 29 is energized, electromagnetic valve 43 is attracted and the carburettor throttle 40 is in its normal low idling position.

As speed increases the voltage waves of governor 4 cause transistor 8 to become alternatively conductive and nonconductive, thus charging and discharging capacitor 11. The higher the frequency delivered by governor 4, the shorter the time available for capacitor 11 to discharge itself through resistor 9 and the lower its peak voltage picked up by diode 12 and capacitor 13.

As the frequency further increases, the voltage of capacitor 13 and therefore of resistor 16 become lower than the voltage threshold imposed to the emitter of transistor 18. Thus, the three transistors 18, 19 and 20 are triggered and winding 29, is de-energized, thus opening the throttle 40. Under these conditions, when the accelerator pedal is released, a somewhat accelerated idling speed is obtained which provides a better combustion than if the throttle were closed completely.

Values suitable for the component elements of the diagram of FIG. 1 may be for example as follows : resistor 7 = 100 kilo-ohms; resistor 9 = 100 kilo-ohms; resistor 10 = 180 ohms; capacitor 11 = 0.22 microfarads; capacitor 13 = 2.5 microfarads; resistor 14 = 470 kilo-ohms; resistor 16 = 100 kilo-ohms; the trigger frequencies of electromagnetic valve 29 may be of the order of 30 Hz.

What is claimed as new is:

1. An air pollution reducing electronic frequency responsive control device for an internal combustion engine of a vehicle having a fuel carburettor and an automatic gear box, comprising, in combination:
   means for controlling the mixture of air and fuel in said carburettor, said means being controlled by said electromagnetic means between one of at least two operating positions, a first position when the vehicle speed is above a predetermined speed and a second position when the vehicle speed is below said predetermined speed, wherein said electromagnetic means prevents said means for controlling the mixture from closing completely above said predetermined vehicle speed;
   governor means connected to said gear box and to a rotating member of said vehicle for generating an output signal having a frequency proportional to the speed of rotation of said rotating member;
   electronic circuit means having an input connected to the signal generating output of said governor means comprising:
      first transistor means for receiving said output signal from said governor means;
      a diode pump; and
      connecting means connecting said diode pump to the output of said first transistor means;
      wherein said diode pump includes a diode having one side connected to said connecting means, a first capacitor connected to said one side of said diode and ground, and a second capacitor and resistor connected in parallel to the other side of said diode and ground;
   second transistor means connected to the output of said diode pump and having an emitter charge;
   a flip-flop circuit including a first transistor connected to a second transistor through resistance means and a third transistor connected to said second transistor, and second transistor being of a polarity opposite said first and third transistors, and negative feedback resistance means connected between the output of said third transistor and the input of said first transistor; and
   means connecting the winding of said electromagnetic means to the output of said third transistor.

2. An air pollution reducing control device according to claim 1, wherein said means for controlling the mixture of air and fuel comprises a carburettor throttle.

3. An air pollution reducing control device according to claim 2, wherein said electromagnetic means is an electromagnetic valve, the device further comprising a vacuum responsive means controlled by said electromagnetic valve, said carburettor throttle being connected to and controlled by said vacuum responsive means.

4. An air pollution reducing control device according to claim 3, wherein said electromagnetic means is an electromagnet, said carburettor throttle being connected to and controlled by said electromagnet.

5. An air pollution reducing electronic frequency responsive control device for an internal combustion engine of a vehicle having a fuel carburettor and an automatic gear box, comprising:
   electromagnetic means;
   first vacuum responsive means controlled by said electromagnetic means;
   means for controlling the mixture of air and fuel in said carburetor, said means for controlling the mixture being controlled by said first vacuum responsive means between one of at least two operating positions, a first when the vehicle speed is above a predetermined speed and a second when the vehicle speed is below said predetermined speed, wherein said electromagnetic means prevents said means for controlling the mixture from closing completely above said predetermined vehicle speed;
   governor means connected to said gear box through a rotating member of said vehicle for generating an output signal having a frequency proportional to the speed of rotation of said rotating member;
   electromagnetic valve means controlled by said governor means for controlling the change of gears in said automatic gear box;
   second vacuum responsive means for controlling the advance of the ignition system of said engine;

electronic circuit means having an input connected to the signal generating output of said governor means comprising:
  first transistor means for receiving said output signal from said governor means;
  a diode pump; and
  connecting means connecting said diode pump to the output of said first transistor means;
  wherein said diode pump includes a diode having one side connected to said connecting means, a first capacitor connected to said one side of said diode and ground, and a second capacitor and resistor connected in parallel to the other side of said diode and ground;
  second transistor means connected to the output of said diode pump and having an emitter charge;
  a flip-flop circuit including a first transistor connected to a second transistor through resistance means and a third transistor connected to said second transistor, said second transistor being of a polarity opposite said first and third transistors, and negative feedback resistance means connected between the output of said third transistor and the input of said first transistor;
  means connecting the winding of said electromagnetic means to the output of said third transistor; and
  means connecting said governor means to said second vacuum responsive means.

6. A control device according to claim 5, further comprising second electromagnetic valve means actuated by said governor means in parallel with the first electromagnetic valve means, said second electromagnetic valve means controlling the advance of said ignition system through said second vacuum responsive means.

7. A control device according to claim 5, further comprising second electromagnetic valve means actuated when said engine starts to control, through said second vacuum-responsive means, the advance of said ignition system of the engine.

8. A control device according to claim 5, wherein the elements comprising said electronic circuit means are assembled together in a common case mounted on said gear box together with said governor.

* * * * *

UNITED STATES PATENT OFFICE
CERTIFICATE OF CORRECTION

Patent No. 3,691,873          Dated September 19, 1972

Inventor(s) Claude LOMBARD et al

It is certified that error appears in the above-identified patent and that said Letters Patent are hereby corrected as shown below:

Letters Patent reflect French Priority
No. 69/32 310 filed September 23, 1969.

Signed and sealed this 30th day of January 1973.

(SEAL)
Attest:

EDWARD M. FLETCHER, JR.
Attesting Officer

ROBERT GOTTSCHALK
Commissioner of Patents